United States Patent
Baumeister et al.

(10) Patent No.: US 7,585,531 B2
(45) Date of Patent: Sep. 8, 2009

(54) METHOD FOR PRODUCTION OF ROLLED DOUGH FOOD PIECE

(75) Inventors: Joaquín Fernández Baumeister, México (MX); Armando Sedano Hernández, Ecatepec Estado de México (MX); Elizabeth Quintana Romero, Tlalnepantla Estado de México (MX); Irene Cruz Leyva, México (MX)

(73) Assignee: Frito-Lay North America, Inc., Plano, TX (US)

( * ) Notice: Subject to any disclaimer, the term of this patent is extended or adjusted under 35 U.S.C. 154(b) by 427 days.

(21) Appl. No.: 11/677,469

(22) Filed: Feb. 21, 2007

(65) Prior Publication Data

US 2008/0199569 A1 Aug. 21, 2008

(51) Int. Cl.
*A23P 1/12* (2006.01)
(52) U.S. Cl. .................. 426/439; 426/502; 426/514; 426/516; 426/517
(58) Field of Classification Search .............. 426/439, 426/502, 514, 516, 517
See application file for complete search history.

(56) References Cited

U.S. PATENT DOCUMENTS

| 2,613,620 | A | | 10/1952 | Allen |
| 3,314,381 | A | * | 4/1967 | Fries et al. ............... 425/131.1 |
| 4,389,176 | A | | 6/1983 | Nenci |
| 4,666,391 | A | | 5/1987 | Watt et al. |
| 4,905,583 | A | | 3/1990 | Hayashi |
| 4,994,293 | A | | 2/1991 | Hayashi |
| 6,079,970 | A | | 6/2000 | Ueno |
| 6,171,628 | B1 | | 1/2001 | Ueno |
| 6,393,974 | B1 | | 5/2002 | Rodriguez et al. |
| 7,156,642 | B2 | | 1/2007 | Anderson et al. |
| 2004/0022910 | A1 | * | 2/2004 | Keller et al. ................. 426/512 |
| 2006/0019013 | A1 | | 1/2006 | Crosby et al. |

* cited by examiner

*Primary Examiner*—Robert B Davis
*Assistant Examiner*—Joseph Leyson
(74) *Attorney, Agent, or Firm*—James R. Gourley; Carstens & Cahoon, LLP

(57) ABSTRACT

A method for producing a rolled snack piece using an extruder having typically a plurality of orifices through which an extrudate exits the extruder. Each of these orifices is spiral shaped. When a desired length of extrudate stream or rope protrudes from an orifice, it is cut at its base, thus producing individual snack pieces that appear to have been rolled after being sheeted.

6 Claims, 5 Drawing Sheets

METHOD FOR PRODUCTION OF ROLLED DOUGH FOOD PIECE

BACKGROUND

1. Technical Field

The present invention relates to an apparatus and method for forming tubes of dough that resemble, when cut, a rolled dough product. Specifically, this invention relates to a method and apparatus for producing rolled dough pieces using an extrusion die having a spiral orifice pattern.

2. Description of Related Art

Rolled products are found in many different food industries such as croissants, wafer sticks, flautas, and frozen/stuffed taquitos. Many prior art processes have been developed to address the complexities of rolling each of these products. For example, the croissant industry generally utilizes a relative speed differential between two belts. The croissant industry uses relatively thick dough with a high degree of tackiness, which makes it fairly easy to manipulate. In contrast, the wafer stick industry typically uses a batter that is drum dried, wound around a mandrel at a 45-degree angle, and then cut into pieces.

In the snack food industry, however, the dough used typically comprises one or more starches and/or flour, which dough is then thinly sheeted, cut into pieces, and then toasted, fried and/or baked. Typical dough types include, but are not limited to, the following: potato, rice, corn-based doughs, and wheat-based doughs. It is particularly desirable to produce a cylindrically shaped snack piece, typically made of thinly sheeted dough that is toasted and/or fried, and seasoned. The dough used in such snack products, unlike the dough used in other food industries, is generally very thin, fragile, and difficult to manipulate. This makes typical rolling technology unacceptable for such an application. Additionally, the processing rates required in the snack food industry are very high relative to other industries, making dough-rolling even more difficult when using a sheeted starting material.

Although hanging curtains have been used in the prior art to roll dough sheets, existing prior art devices suffer from less-complete rolling of product when dough sheets fail to separate from the conveying surface upon meeting such hanging curtains. Furthermore, prior art dough-rolling devices lack the ability to produce rolled products from thin dough pieces reliably, efficiently, and at high volume and high speed. For example, U.S. Pat. No. 6,393,974 B1 (the "'974 Patent"), titled "Apparatus for Production of a Small Tortilla," is directed towards an apparatus for rolling raw tortillas into the shape of a taco. Although the '974 patent discloses the use of hanging curtains over flat conveyors, there has never been a ramped dough-rolling apparatus to enable more reliable, complete rolling. The '974 patent relates to a dough-rolling apparatus having a "pre-rolling up mesh" and a "final rolling up mesh," and it repeatedly emphasizes the need for such meshes to be positioned over an "acceleration conveyor" that operates faster than the preceding "exit conveyor." For example, the '974 patent at column 4, lines 53-55, states that "[n]ext to the exit conveyor 106 is an acceleration conveyor 108 with an equal transversal section that advances at a greater speed than the exit conveyor 106." At column 5, lines 6-14, the '974 patent continues, "pre-rolling up meshes 119 are placed with a small surface of contact and dragging with the mesh of acceleration conveyor 108 . . . . The final rolling up meshes 120 show a greater surface of contact and dragging with the acceleration conveyor 108 . . . . " Operating and maintaining an acceleration conveyor in addition to a sheeter exit conveyor is undesirable, as it introduces another potential product transfer point where problems may occur. Adding a second conveyor of a different operating speed to the system can also increase the complexity of the control process and add capital expense. The '974 patent also states in column 1, lines 58-63: "adjustment of the speed of the exit conveyor together with modifications to the rollers is required. The new structure of the laminator eliminates the versatility of such conveyor and renders the laminator incapable of being used afterwards as other types of products requires speeds by which the laminator was redesigned."

Another prior art dough-rolling apparatus is disclosed in U.S. Pat. No. 6,171,628 B1 (the "'628 Patent"), which issued to Ueno on Jan. 9, 2001 and is titled "Method for Rolling Up a Sheet of Dough." Although the '628 patent discloses the use of hanging curtains to induce sheets of dough to roll, the '628 patent actually teaches away from the use of hanging curtains and is instead directed towards a roll-up roller for rolling sheets of dough. See '628 patent at column 1, lines 38-40; '628 patent FIGS. 7a, 7b and 7c (illustrating common jamming problems associated with dough-rolling curtains).

U.S. Pat. No. 6,079,970 (the "'970 Patent") issued to Ueno on Jun. 27, 2000, and is titled "Apparatus for Rolling Up a Sheet of Dough." Like the later-issued '628 patent, the '970 patent actually teaches away from and discourages the use of hanging curtains and is instead directed towards a roll-up roller for rolling sheets of dough. See '970 patent at column 1, lines 35-37; '970 patent FIGS. 7a, 7b and 7c.

U.S. Pat. No. 4,994,293 (the "'293 patent") and U.S. Pat. No. 4,905,583 (the "'583 Patent") were granted to Hayashi on Feb. 19, 1991 and Mar. 6, 1990 and are titled "Method for Rolling Croissant Dough Pieces" and "Apparatus and Method for Rolling Croissant Dough Pieces," respectively. The '583 patent and the '293 patent, which is a divisional application of the '583 patent, are both directed towards an apparatus and method for rolling triangular dough pieces into croissant shapes using a flexible hanging screen. The '293 and '583 patents emphasize that the dough pieces are to be stretched and transferred to a rolling apparatus without significantly decreasing the adhesiveness of the dough pieces. Whereas prior art methods for rolling dough pieces into croissant shapes employed the use of flour to make dough pieces less adhesive and more easily managed, the '293 and the '583 patents teach that such loss of adhesiveness is disadvantageous for producing tightly-wound croissants. The '293 and '583 patents, however, do not provide a means for ensuring that the dough-rolling curtain effectively initiates a rolling action, nor do they offer solutions to the problems of effecting more complete rolling and preventing product jamming along the flat surface of the dough-rolling conveyor. While it is possible to use a single dough-rolling curtain to roll a piece of sheeted dough, such a device tends to have lower rolling efficiency and lower throughput than is desirable.

U.S. Pat. No. 4,666,391 (the "'391 patent") was granted to Watt et al. on May 19, 1987 and is titled "Apparatus for Rolling Up a Pastry Layer and a Separator Sheet."The '391 patent is directed towards an apparatus for forming rolled pastries having a film interposed between adjacent rolled layers to inhibit the layers from sticking to each other. While the '391 patent discloses the use of a single drag-inducing member as a roll-up device over a flat conveying surface, the '391 patent does not address the problem of jamming, which occurs when sheeted dough fails to separate From the conveying surface upon meeting the drag-inducing member.

U.S. Pat. No. 4,389,176 (the "'176" Patent) was granted to Nenci on Jun. 21, 1983 and is titled "Machine for the Production of Tubular Casings of Alimentary Dough." The '176 patent relates to a dough-rolling device in which pieces of dough are rolled around support cores to form cannoli tubes. While the '176 patent discloses the use of a metal mesh screen as a dough-rolling device, the metal mesh of the '176 Patent is supported and held taught between two rollers. See '176 patent at column 6, lines 26-30. A taught, flat mesh screen would not be appropriate for thin and fragile doughs such as thinly-sheeted corn masa, because such a flat screen may unduly concentrate rolling forces and pressure at the minimal contact area between the flat screen and rolled masa products. This would likely result in destruction of the fragile masa product. Thus, a flexible chain or mesh curtain is critical for rolling fragile dough pre-forms.

U.S. Pat. No. 7,156,642 (the "'642 Patent") issued on Jan. 2, 2007, and is entitled "Dough Rolling Apparatus and Method." The apparatus disclosed in the '642 Patent comprises a dough-rolling apparatus having a dough sheeter, a receiving conveyor having a ramped section, a roll-initiating curtain positioned above the ramped section just downstream of the peak of the ramp, and a roll-completing curtain positioned downstream from the roll-initiating curtain. A ramped dough-rolling conveyor solves the problem of pre-forms (sheeted and cut pieces of dough) jamming and failing to roll as they pass under the first curtain or set of curtains. While the '642 patent is an improvement over the prior art in this field, careful attention is required to several of the components of the '642 patented apparatus in order to maintain a consistently rolled product. For example, if any dough builds upon the rolling curtains, the shape of the end product is altered. As with any sheeting arrangement, there is also always present the issues of dough build-up on components, thus requiring frequent cleaning.

Consequently, a need exists for an apparatus and method that can produce a rolled dough product consistently and with few components contacting the dough, in order to avoid dough build-up issues. Such apparatus and method should also be able to produce a rolled, dough-based snack product at a high production speed consistent with the economics of the snack food industry.

SUMMARY OF THE INVENTION

The invention comprises a method and apparatus for producing a rolled dough product. This rolled dough product is formed as individual pieces with the appearance of a flautas or taquito shape. The pieces are formed by extruding a food dough through a spiral shaped orifice. The extrudate is cut into individual segments, thus forming individual food pieces. These pieces can then be cooked, typically by frying.

By forming these pieces by using an extruder, as opposed to a sheeting process, many of the problems encountered in the prior art are overcome. The process is simple, efficient, and provides for a high throughput of product. Complex sheeting, cutting, and rolling apparatus are not required. The issue of dough build-up typically encountered with sheeting operations is avoided. The invention produces a consistent product with few components contacting the dough and in a manner highly complimentary with the economics of the snack food industry.

Additional features and benefits of the present invention will become apparent in the following written detailed description.

BRIEF DESCRIPTION OF THE DRAWINGS

The novel features believed characteristic of the invention are set forth in the appended claims. The invention itself however, as well as a preferred mode of use, further objectives and advantages thereof, will be best understood by reference to the following detailed description of illustrative embodiments when read in conjunction with the accompanying drawings, wherein:

DETAILED DESCRIPTION

Applicants' invention produces a snack food piece that is rolled in appearance, but is not rolled by way of manufacture, at least not by methods used in the prior art. Rather, Applicants use extrusion technology to produce a food piece that gives the appearance of having been rolled from a sheeted process.

Figure 1A:
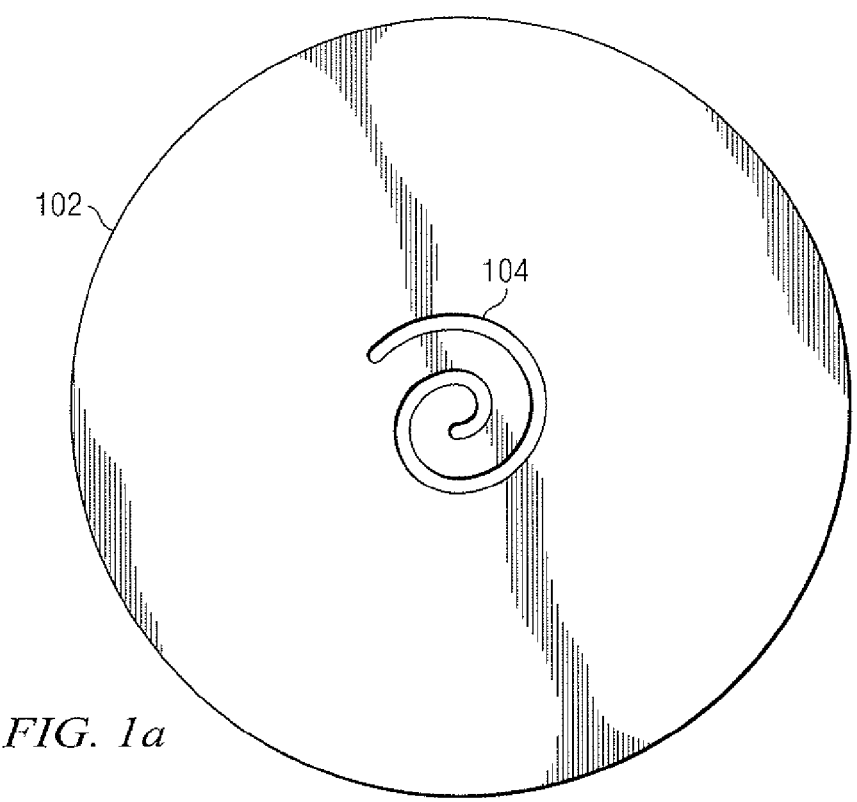
FIGS. 1a and 1b are plan views of one embodiment of an extruder die insert of the present invention.
Figure 1B:
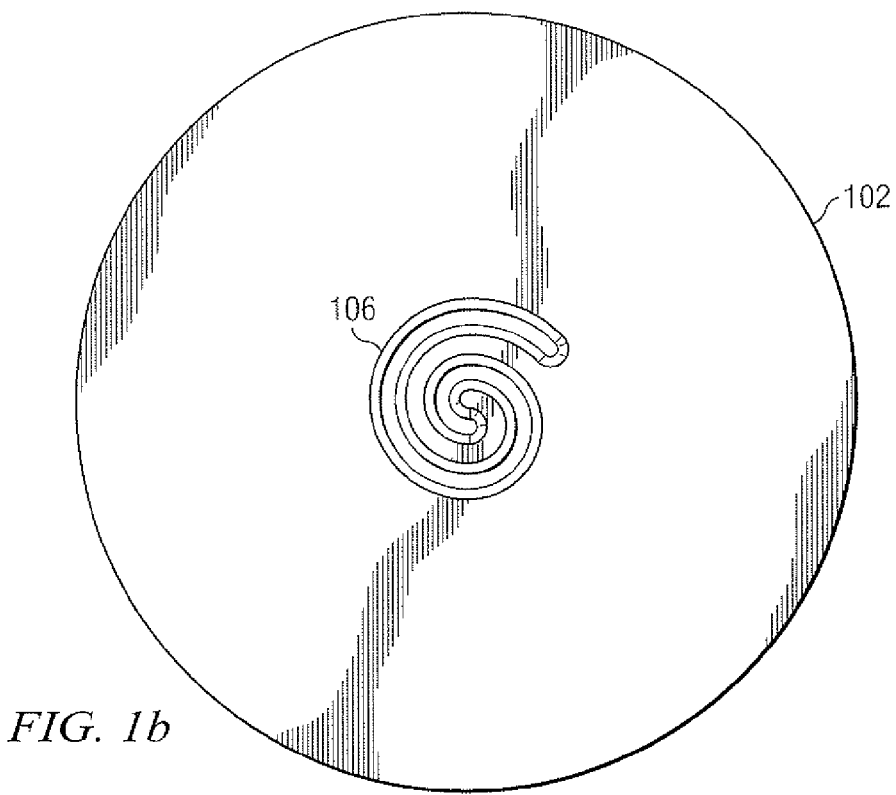

FIGS. 1a and 1b show the front (exit) and the rear (input), respectively, of an extrusion die insert 102 in accordance with one embodiment of Applicants' invention. Referring to FIG. 1a, the die insert 102 is shown in a plan view from the perspective of the exit portion of the Applicants' spiral shaped orifice 104. FIG. 1b, again a plan view, shows the opposite side of the die insert 102, thus revealing the entry opening to the spiral shaped orifice 106. It should be noted that the entry 106 to the orifice is wider than the exit 104 of the orifice. The interior width of the orifice between the entry 106 and exit 104 gradually and linearly reduces from the entry 106 width to the exit 104 width, in the embodiment illustrated. This width reduction allows for the introduction of extrudate into the die insert 102 from the extruder and facilitates the pressure differential between the exiting extrudate and the extrudate within the extruder. Typical width of the exit portion of the orifice 104 is between about 0.5 mm and about 3.0 mm, with the width of the entry 106 about twice the width of the exit 104.

Figure 2:
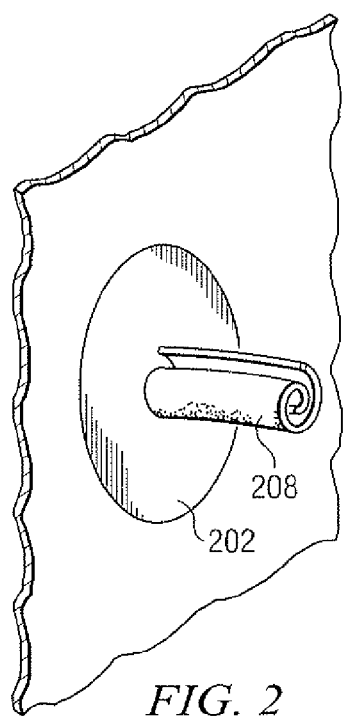
FIG. 2 is a perspective view of extrudate exiting an extruder die in accordance with one embodiment of the invention.

The operation of an individual die insert with regard to a larger extrusion device will be explained further below. Referring to FIG. 2, however, the die insert 202 is shown along with an extruded material 208 emerging from the spiral shaped orifice. This extruded material 208 (or extrudate), when extruded at high speeds, forms essentially a dough or extrudate rope that, in its cross-section, is spiral shaped. Upon exiting the extruder at approximately the length shown in FIG. 2 (about 3.0 cm to about 3.5 cm in one embodiment having a width of about 0.9 cm to about 1.3 cm), the extrudate rope is cut by means known in the art along the surface of the die insert 202. Cutting the extrudate 208 into individual pieces produces a rolled dough product that can then be cooked, typically by frying, by methods known in the art.

Figure 3A:
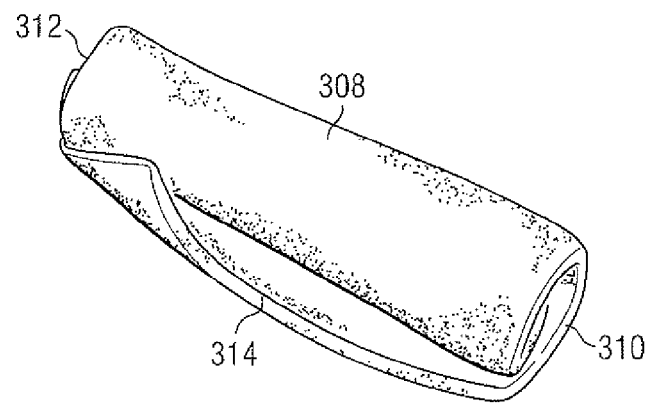
FIGS. 3a and 3b are perspective views of a product made in accordance with one embodiment of the present invention.
Figure 3B:
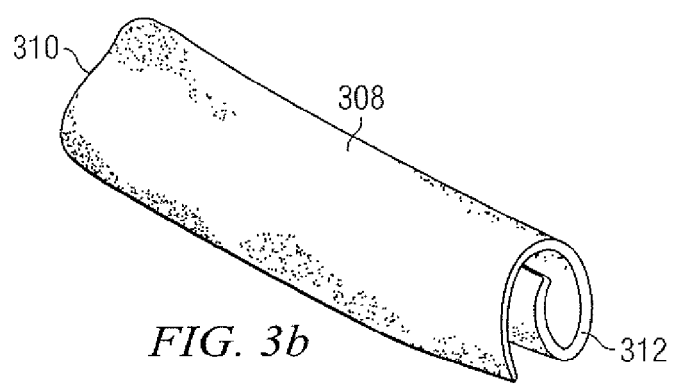

Referring to FIGS. 3a and 3b, a typical snack piece 308 formed by Applicants' method and apparatus is illustrated. The individual piece 308 has a first end 312 and a second end 310. It should be observed that the second end 310 is generally a flatter surface, as the second end 310 results from the cutting of the extrudate at the face of the die insert as described above. The first end 312 of the piece, therefore, first forms by emerging from the die insert immediately after the previous piece had been cut off along the face of the die insert. Variations in the axially flow rate of the extrudate through the orifice result in the slightly irregular shape of the first end 312 of the piece. Also shown in FIG. 3a is a slightly opened flap 314. This slightly opened flap 314 may be desirable in order to give the food piece a shape that is more conducive to using the piece 308 as a scoop for various dips, sauces, and salsas. The shape of this flap 314 is dependent on the dough material used, the various processing parameters through the extruder, and the shape of the die insert orifice. An additional embodiment of the die insert orifice that provides for a more open flap 314 is discussed below in regard to FIGS. 5a and 5b. Typically, the piece can range in length from 1 cm to 40 cm and width from 0.5 cm to 3.0 cm.

Figure 4:
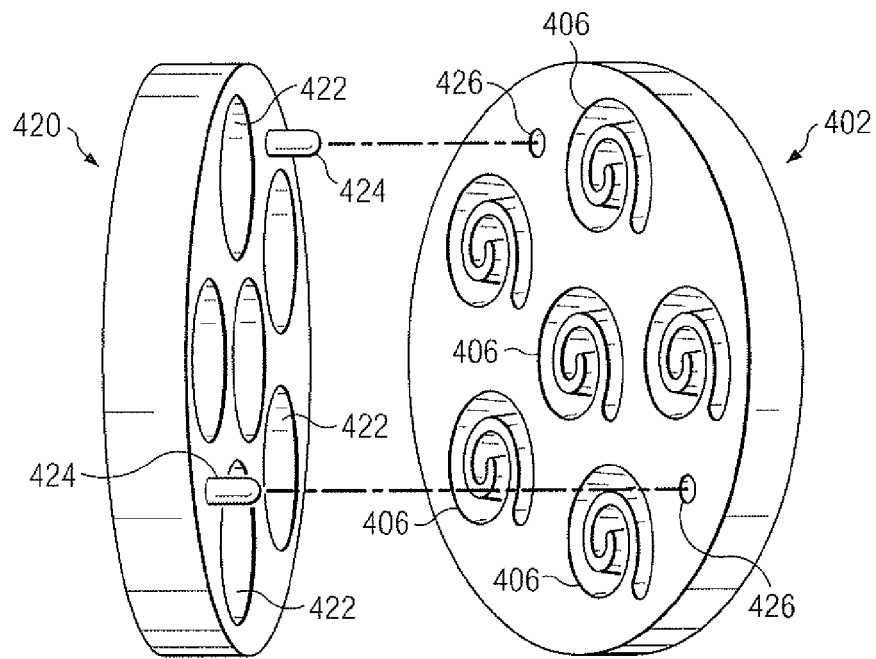
FIG. 4 is an exploded view of an extruder die insert assembly in accordance with one embodiment of the present invention.

Referring to FIG. 4, illustrated is an exploded view of a forming die insert 402 and its accompanying spacing die insert 420. This particular forming die insert 402 has six individual spiral shaped orifices 406 on a single insert. The forming die insert 402 mates with the spacing die insert 420 and maintains appropriate position therewith by means of two posts 424 on the spacing die insert 420 that are received by two ports 426 on the forming die insert 402. The purpose of the spacing die insert 420 is to channelize the extrudate flow from the body of the extruder into the discrete dough channels through corresponding openings 422 that mate up with, and direct flow to, individual orifices 406. Consequently, in operation, an extrudate dough first flows through the openings 422 of the spacing die insert 420 and then through the orifices 406 of the forming die insert 402.

Figure 5A:
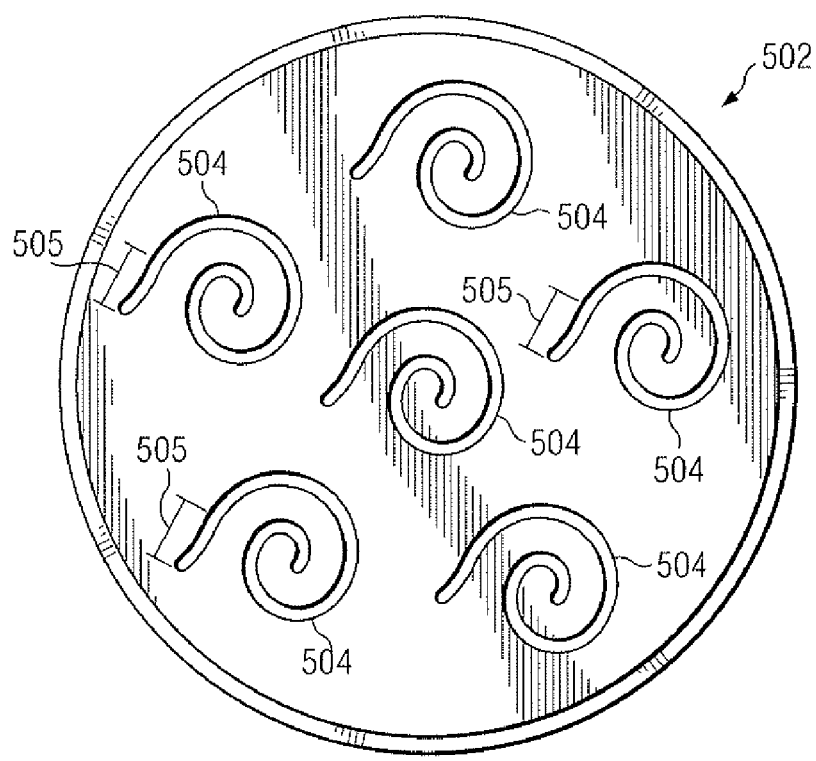
FIGS. 5a and 5b are views of the front and rear of a die insert assembly in accordance with one embodiment of the present invention.
Figure 5B:
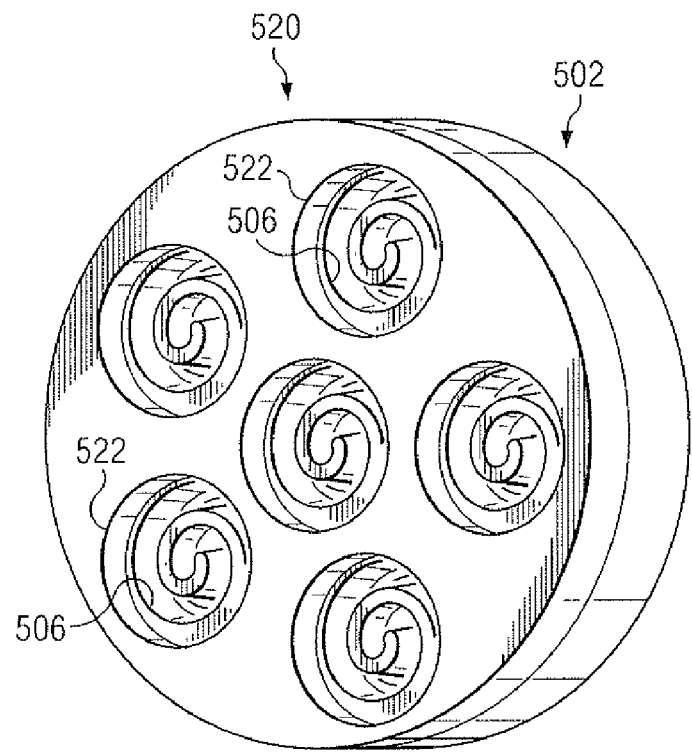

FIGS. 5a and 5b show an alternative embodiment of a die insert assembly. FIG. 5a shows in a plan view the forming die insert 502 with several individual spiral shaped orifices 504 having a slightly different shape from that shown in FIG. 4. In particular, it can be seen in FIG. 5a that each spiral shaped orifice 504 has a tail or end portion 505 that, when viewed from outside of the spiral, reverses the curvature of the spiral 504 from convex to concave. Consequently, the orifice 504 on the embodiment illustrated in FIG. 5a is said to have a concave end portion 505. Applicants' use of the term "concave end portion" is intended to describe the portion 505 of the orifice 504 illustrated in FIG. 5a. A die insert having this concave end portion produces an end product with a taco-like shape.

FIG. 5b shows how the die assembly mates the openings 522 of the spacing die insert 520 with the orifice 506 of the forming die insert. It should be understood that more than one spacing die insert can be used with Applicants' forming die insert, but Applicants have illustrated a single spacing die insert 520 as a preferred embodiment. Extrudate flows through the opening 522, then into the spiral orifice 506.

Figure 6:
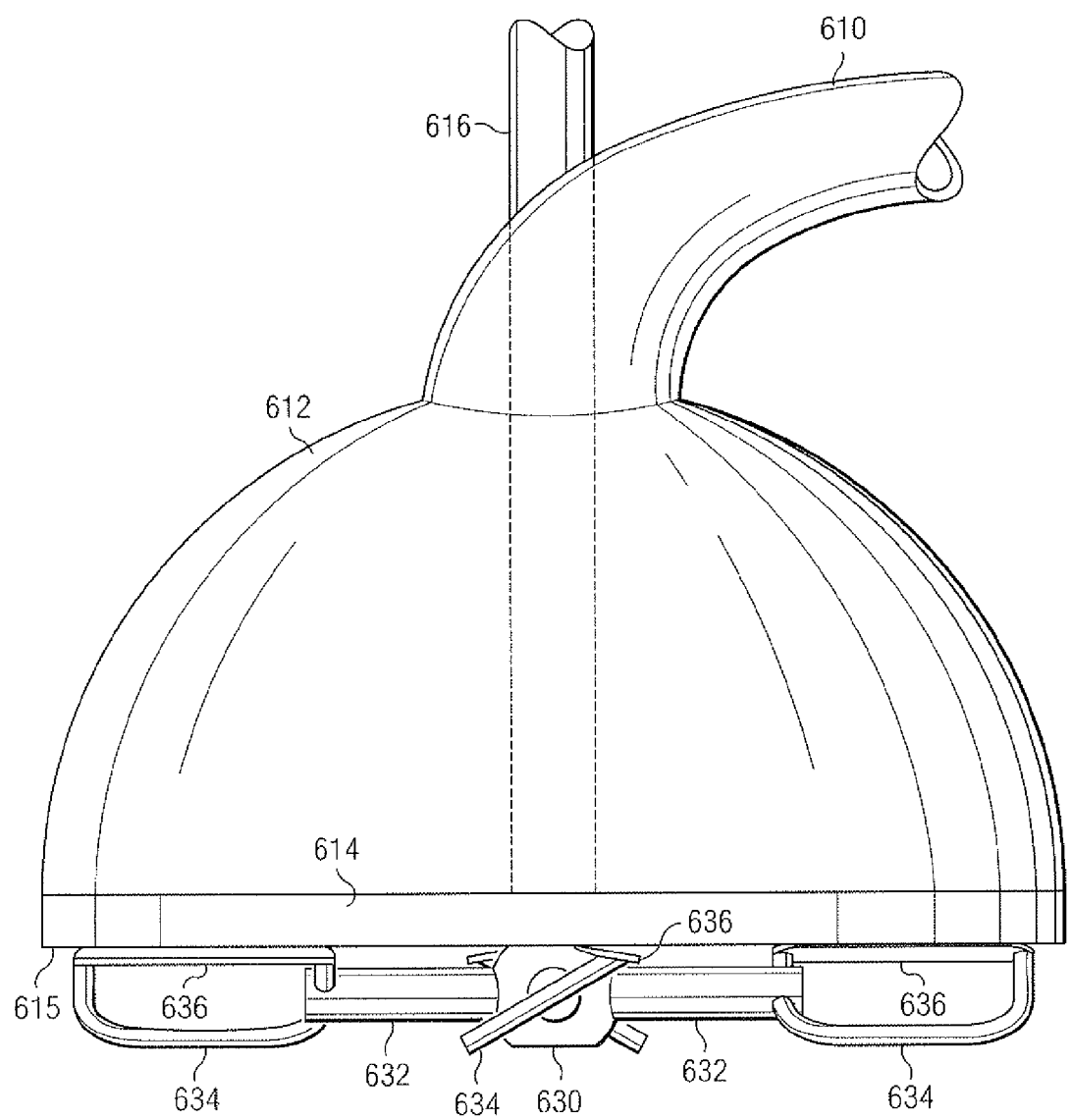
FIG. 6 is a side view of a prior art extruder and cutting mechanism.

FIG. 6 shows a side view of a prior art tube turn 610, bell 612, and die 614 assembly of an extruder. In operation, product, such as masa, is forced through the tube turn 610 and into the bell 612. It is then extruded through the die 614. A shaft 616 extends through the turn 610, bell 612, and die 614. Mounted on the end of the shaft 616 is a cutting mechanism. The cutting mechanism comprises a hub 630, spokes 632 extending from the hub 630, and blade holders 634 attached to the spokes. Each blade holders 634 in turn maintains a blade 636 in contact with the die 614.

Figure 7:
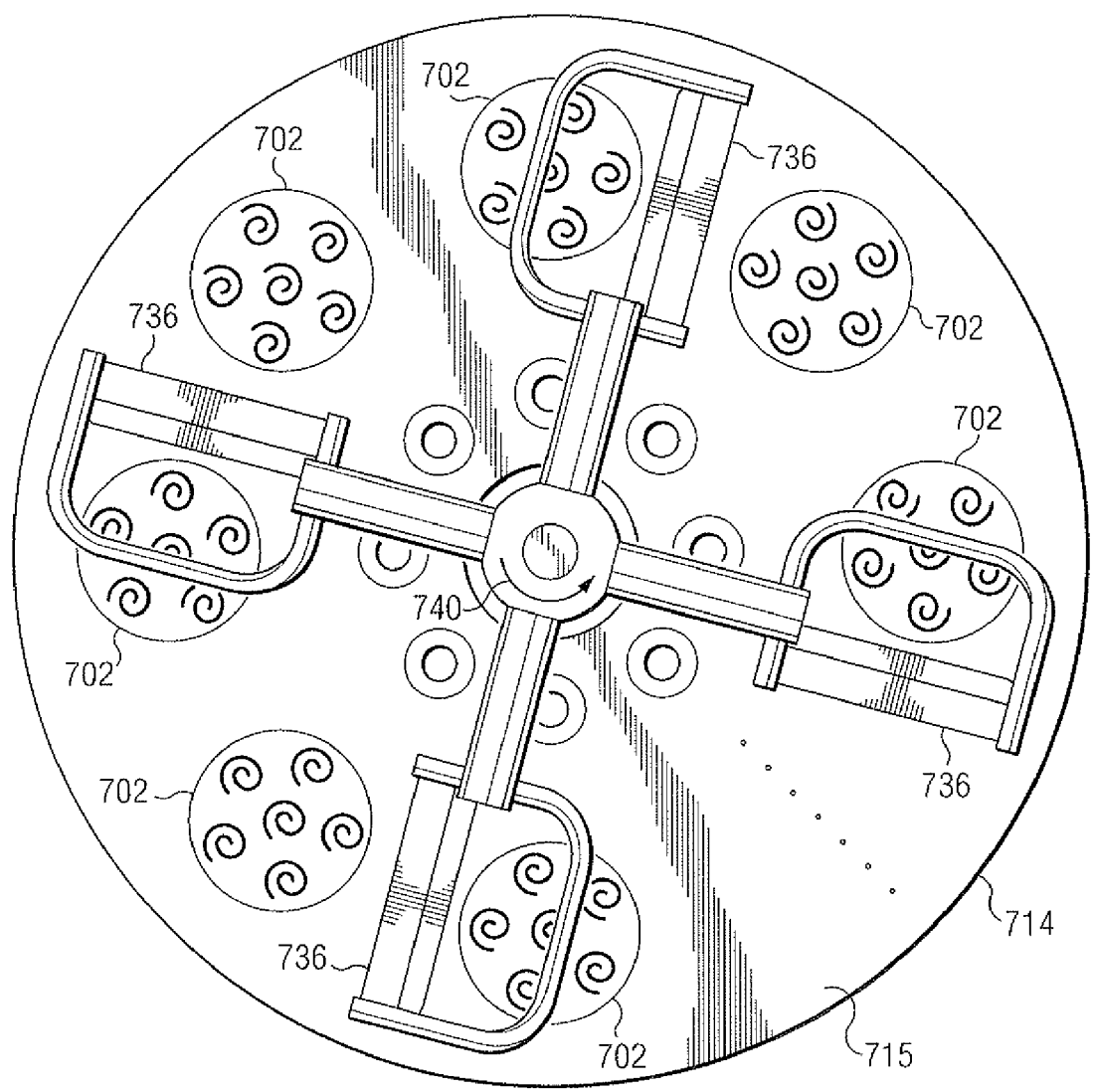
FIG. 7 is a plan view of the extruder die face in accordance with an embodiment of the present invention.

FIG. 7 shows a plan view of the die face 715 of one embodiment of Applicants' invention. The die face 715 will typically exhibit a number of die inserts 702 having at least one orifice each, thus allowing communication of the product from the bell, through the die 714, and onto the die face 715. As the product emerges from these orifices, it is cut into relatively uniform pieces by the blades 736 as the entire cutting mechanism rotates about the shaft in the direction 740 illustrated in FIG. 7. Such rotation 740 is typically in speeds ranging from fifty to three hundred rpm, with approximately one hundred forty rpm generally used for cutting masa extrudate. It should be understood that the cutting mechanism shown in FIG. 7 is but one of several embodiments of prior art cutting devices that can be used to cut the extrudate as it exits the orifices. For example, oscillating blades or cutting wires can also be used.

It should also be understood that any direct low pressure or high pressure extrusion process (pneumatic, hydraulic, vertical, horizontal, or pump-driven extruder) can be used to push the extrudate dough through the forming die to form the food pieces in accordance with Applicants' invention. In a preferred embodiment, a vertical extruder, such as a vertical extruder by which a single piston in vertical position pushes and advances the extrudate dough against the forming die and therefore forcing its flow through the orifice, is used. A typical reciprocal pressure in such extruder using corn based doughs and Applicants' method is from about 300 psi to about 1200 psi, depending on the extruder's flow rate elected.

Process conditions can be varied to obtain different product textures and flavors. Some of these process conditions include the degree of cooking of the base material prior to extrusion, the temperature of the extrudate, the moisture of the extrudate, the particle size distribution of the extrudate, the length of the piece produced, and the cooking time and temperature.

In one preferred embodiment, a nixtamlized corn-based flour, such as Maseca flour, is mixed with water to a dough moisture level of between 45% to 55% by weight, or preferably about 49%. If the dough has too much moisture it will lose its shape as it exits the die. Conversely, if it has too little moisture, it will stick to the extruder, die, or other equipment. A typical mixing time of the flour with water is from about 10 to about 30 minutes in a low-shear mixing operation. The purpose of this mixing step is hydration of the flour.

Another embodiment uses masa made from fresh corn meal. This masa, in a preferred embodiment, is made of a blend of yellow and white corn (typically a 50/50 blend). It is cooked with a 1% by weight addition of lime until it has a moisture content of about 36%, which typically takes 6-8 minutes. It is then soaked until the moisture content is about 45%, which normally takes about twelve hours. The corn is then drained of the water and washed. This whole, cooked, soaked, and washed corn is then transported up a drain belt to a corn mill having a mill gap setting of between 0.017 inches and 0.023 inches, with 0.020 inches as the aim. Water is added with the coin at the corn mill in order to bring the total moisture level by weight of the resultant corn-based dough to between about 45% to about 51%, with the same consideration for shape retention and dough stickiness described above.

In a preferred embodiment, the corn-based dough is then extruded as previously detailed. Temperature of the dough in the extruder ranges from about 18° C. to about 28° C. for nixtamalized corn flour masa and from about 30° C. to about 40° C. for fresh stonemilled corn masa. The extrudate rope is cut into individual pieces as it exits the extruder, preferably in a length of about 3.0 cm to about 7.0 cm. In the preferred embodiment these food pieces are then immediately fried in hot oil, typically with a fryer temperature from about 190° C. to about 198° C. The dwell time in the fryer for a typical product produced by Applicants' preferred embodiment is between 25 seconds to about 60 seconds, depending on the size and texture and flavor desired. The individual food pieces are typically fried to a moisture level of approximately 1% to 3%. Pieces are then seasoned and packaged by methods previously known in the art.

While the invention has been particularly shown and described with reference to a preferred embodiment, it will be understood by those skilled in the art that various changes in form and detail may be made therein without departing from the spirit and scope of the invention. In particular, it is understood that Applicants' invention can be used to produce a product that is rolled in appearance made from a number of suitable starting materials, either alone or in combination, such as wheat, rice, oats, sorghum, barley, malted barley, rye, malted rye, malted wheat, malted corn, and other grains or pseudocereals such as amaranth, vegetables and legumes such as soy beans, beans, lima beans, peas, chick peas, lentils, as well as tuberous amylaceous starch sources such as potato, camote, yucca, dairy and meat products such as cheese curd, milk caseine/caseinates, yoghurt, pork meat and its byproducts, beef meat and its byproducts, and chicken meat and its byproducts.

We claim:

1. A method for producing a rolled shaped food piece, said method comprising the steps of:
   a) preparing a dough;
   b) extruding said dough through a spiral shaped orifice with a concave end portion, thereby forming an extrudate rope;
   c) cutting said extrudate rope into individual pieces; and
   d) cooking said individual pieces, thereby producing rolled shaped food pieces.

2. The method of claim 1 wherein said dough comprises corn.

3. The method of claim 2 wherein said dough consists of hydrated corn meal.

4. The method of claim 1 wherein said dough comprises between about 45% and about 55% water by weight prior to extrusion.

5. The method of claim 1 wherein the cooking of step d) comprises frying.

6. The method of claim 1 wherein the extrudate rope is cut at step c) such that the individual pieces are between 3.0 cm and 7.0 cm in length.

* * * * *